United States Patent
Menke et al.

(10) Patent No.: US 8,343,884 B2
(45) Date of Patent: Jan. 1, 2013

(54) PASSIVE OPTOCERAMICS WITH CUBIC CRYSTAL STRUCTURE, PROCESS FOR MANUFACTURING THE SAME AND THEIR USES

(75) Inventors: Yvonne Menke, Mainz (DE); Ulrich Peuchert, Bodenheim (DE); Akio Ikesue, Nagoya (JP)

(73) Assignee: Schott AG, Mainz (DE)

( * ) Notice: Subject to any disclaimer, the term of this patent is extended or adjusted under 35 U.S.C. 154(b) by 267 days.

(21) Appl. No.: 12/728,367

(22) Filed: Mar. 22, 2010

(65) Prior Publication Data
US 2010/0248938 A1 Sep. 30, 2010

(30) Foreign Application Priority Data
Mar. 31, 2009 (EP) .................................. 09157002

(51) Int. Cl.
C04B 35/50 (2006.01)
C04B 35/51 (2006.01)
C04B 35/48 (2006.01)
C04B 35/49 (2006.01)
C04B 35/00 (2006.01)
B28B 1/00 (2006.01)
B28B 3/00 (2006.01)

(52) U.S. Cl. ......... 501/152; 501/102; 501/126; 264/681

(58) Field of Classification Search ................... 501/102, 501/103, 126, 134, 152; 264/604, 673, 681
See application file for complete search history.

(56) References Cited

U.S. PATENT DOCUMENTS

| 6,908,872 | B2 | 6/2005 | Tanaka et al. |
| 2008/0164626 | A1 | 7/2008 | Zimmer et al. |
| 2008/0233406 | A1* | 9/2008 | Hayashi ........................ 428/426 |
| 2008/0278823 | A1* | 11/2008 | Peuchert et al. .............. 359/664 |

FOREIGN PATENT DOCUMENTS

| CN | 1587196 | 3/2005 |
| DE | 10 2006 045 072 | 3/2007 |
| DE | 10 2007 002 079 | 7/2008 |
| EP | 1 992 599 | 11/2008 |
| WO | 2007/060816 | 5/2007 |

OTHER PUBLICATIONS

JP 200203933, Jul. 25, 2000 (English Abstract Only).
"The Properties of Optical Glass" Bach, Hans; Neuroth, Norbert (HRSG.), Berlin: Springer 1995.
Schott Series on Glass and Glass Ceramics: Science, Technology and Applications; XVII, 410, p. 2, Corr. Print 1998, XVII, 414S.
Shcherbakova et al., Russ. Chem. Rev. 48, 423, 1979.
K.N. Portnoi et al: "Izvestiya Akademii Nauk SSSR, Neorganicheskie Materialy", vol. 6, No. 1, 91, 1970.

(Continued)

*Primary Examiner* — Melvin C Mayes
*Assistant Examiner* — Noah Wiese
(74) *Attorney, Agent, or Firm* — Michael J. Striker (57) ABSTRACT

The optoceramics are transparent to visible light and/or infrared radiation. The optoceramics each consist of a crystal matrix, i.e. of polycrystalline material, wherein at least 95% by weight, preferably at least 98% by weight, of the single crystallites have a cubic pyrochlore or a fluorite structure. Refractive, transmissive or diffractive optical elements made with the optoceramics, their uses and an optical imaging system comprising at least one of the optical elements are also disclosed. Methods of manufacturing the optoceramics are described.

18 Claims, 1 Drawing Sheet

OTHER PUBLICATIONS

Malkin et al. Phys. Rev. B70, 075112, 2004.
Ji et al: "Fabrication of Transparent . . . ", Mat. Res. Bull. 40 (3), 553-559, 2005.
Ji et al: "LA2 . . . Ceramic Schintillator for X-Ray Omaging" J. Mater. Res., vol. 20 (3), 567-570, 2005.
Ji et al: "Preparation and Spectroscopic . . . " Materials Letters, 59 (8-9), 868-871, Apr. 2005.
Klimin et al: "Physics of Solid State" vol. 47, No. 8, 2005.
Subramanian et al: "Oxide Pyrochlores—A Review" Prog. Solid. St. Chem. vol. 15, p. 55-143, 1983.
Terki et al: "Full Potential Linearized . . . " J. Appl. Phys. vol. 96 (11) 5482-6487, 2001.
Saltykov: "Stereometrische Metallographie" Deutscher Verlag Fuer Grundstoffindustrie, Leipzig 1974.
J. Mouzon :"Synthesis of Yb:Y2O3 Nanoparticles . . . " Lulea University of Technologyint. No. 200529, May 2005.

* cited by examiner

PASSIVE OPTOCERAMICS WITH CUBIC CRYSTAL STRUCTURE, PROCESS FOR MANUFACTURING THE SAME AND THEIR USES

CROSS-REFERENCE

The invention described and claimed herein below is also described in European Patent Application 09 157 992.8, filed Mar. 31, 2009 in Europe. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The present invention relates to optoceramics, a process for their production and their uses. The invention also relates to refractive, transmissive or diffractive optical elements manufactured from these optoceramics as well as imaging optics. These optoceramics and optical elements are permeable to visible light and/or infrared radiation. The optoceramics consist of a crystal network, i.e. they constitute poly-crystalline material that is composed of a multitude of individual crystals.

2. Description of the Related Art

An optoceramic according to the present invention is highly transparent material that is essentially single phase, polycrystalline and based on an oxide or other chalcogenide. Optoceramics are a subdivision of ceramics. "Single phase" in this context means that more than 95% by weight of the material, preferably at least 97% by weight, more preferably at least 99% by weight and most preferably 99.5 to 99.9% by weight of the material, is present in the form of crystals of the desired composition (target composition). The individual crystals are arranged densely and have densities relative to their theoretical densities of at least 99%, preferably at least 99.9%, and more preferably at least 99.99%. Accordingly, the optoceramics are nearly free of pores.

The use in imaging optics refers to the use of the optoceramics according to the present invention in shapes that have curved surfaces at the entry and/or exit position of light, i.e. they preferably have lens shapes.

Optoceramics are distinguished from glass ceramics by the fact that glass ceramics comprise high proportions of an amorphous glass phase next to a crystal-line phase.

Similarly, a distinction between optoceramics and conventional ceramics are the high densities of optoceramics which cannot be achieved in conventional ceramics.

Neither glass ceramics nor conventional ceramics have the advantageous properties of optoceramics, such as refractive indexes, Abbe numbers, values for relative partial dispersion and particularly the advantageous high transparency for light in the visible and/or infrared spectral range.

The optoceramics according to the present invention are transparent enough to be suited for optical applications. Preferably, the optoceramics are transparent in the visible spectral range or in the infrared spectral range. Most preferably, they are transparent in the visible as well as in the infrared spectral range.

"Transparency in the visible spectral range" in the context of the present invention means an internal transmittance within a range of at least 200 nm width between 380 nm and 800 nm, for example in a range from 400 to 600 nm, in a range of from 450 to 750 nm or preferably in a range from 600 to 800 nm of above 70%, preferably above 80%, more preferably above 90%, and particularly preferably above 95% at a layer thickness of 2 mm, preferably even at a layer thickness of 3 mm, and especially preferably at a layer thickness of 5 mm.

The percentages of internal transmittance given above relate to the maximum internal transmittance that can theoretically be achieved with the material that the respective optoceramic consists of. The maximum internal transmittance that can theoretically be achieved with a certain material is determined by measuring the internal transmittance of a single crystal made of the same material. Consequently, the percentages of internal transmittance are indicative of the reflection and scattering losses at the grain boundaries in the polycrystalline material, while absorption and reflection at the phase boundaries between adjacent atmosphere and material are neglected.

"Transparency in the infrared spectral range" in the context of the present invention means an internal transmittance within a range of at least 1000 nm width between 800 nm and 5000 nm, for example in a range of from 1000 to 2000 nm, in a range of from 1500 to 2500 nm or preferably in a range of from 3000 to 4000 nm of above 70%, preferably of >80%, more preferably of >90%, particularly preferably of >95% at a layer thickness of 2 mm, preferably even at a layer thickness of 3 mm, particularly preferably at a layer thickness of 5 mm.

Ideally, the material exhibits a transmission (including reflection losses) of more than 20% at a layer thickness of 3 mm and in a wavelength range of more than 200 nm width between 5000 nm and 8000 nm.

The optical elements obtainable from the optoceramics as described herein are particularly suitable for use in imaging optics like for example objectives with reduced color aberrations, especially with approximately apochromatic imaging properties. The optical elements manufactured from optoceramics according to the present invention are usable within lens systems in association with lenses of glass and other ceramic lenses as well, especially also in digital cameras, in the field of microscopy, microlithography, optical data storage or other applications.

The main target in the development of imaging optics is sufficient optical quality while maintaining compact and preferably light construction of the optical system. Especially for applications in digital image capturing within electronic devices like for example digital cameras, objectives in mobile phones and the like, the optical imaging system must be very small and light. In other words, the total number of imaging lenses must be kept as low as possible.

In the area of microscopy nearly diffraction limited imaging optics are needed for the ocular as well as the objective.

For the sector of military defense transparent optical systems are needed, which preferably show high transmissions in the visible wavelength region (380 to 800 nm) as well as in the infrared up to 8000 nm, ideally up to 10000 nm. Furthermore these optical systems must be resistant to external attack like mechanical influence, like for example collision, temperature, change in temperature, pressure etc.

For many other technologies like for example digital projection and other display technologies highly transparent material is needed. But also in mainly monochromatic applications like optical storage technologies compact systems can be realized by application of material with high refractive index.

Today, development of imaging optics is limited by optical parameters of the available material. With the glass melting and molding techniques, which are available today, only such glass types can be produced with sufficient quality that are located in the Abbe diagram underneath a line that runs through the points Abbe number=80/refractive index=1.7 and Abbe number=10/refractive index=2.0. More precisely, glasses with refractive indices between about 1.9 and about 2.2 and Abbe numbers in the range of from about 30 to about 40 tend to be unstable so that it is very difficult to manufacture such glasses in considerable amounts and sufficient quality. Similarly, glasses with refractive indices of between about 1.8 and 2.1 and Abbe numbers in the range of from about 30 and 55 tend to be unstable.

Next to refractive index and Abbe number the relative partial dispersion is also important when choosing optical material. If it is intended to produce almost apochromatic optical systems, the combination of material with almost equal relative partial dispersions and big differences in Abbe number is necessary. If the partial dispersion $P_{g,F}$ is plotted against Abbe number, most glasses lie on a line ("normal line"). Desirable are materials in which the combination of Abbe number and relative partial dispersion deviates from the normal line.

The definitions of refractive index $n_d$, Abbe number $v_d$ and relative partial dispersion $P_{g,F}$ are known to the person skilled in the art and can be understood by studying the relevant technical literature. The definitions can, for example, be found in "The Properties of Optical Glass"; Bach, Hans; Neuroth, Norbert (Hrsg.), Berlin (u.a.): Springer, 1995.—(Schott series on glass and glass ceramics: science, technology, and applications; 1), XVII, 410 p.-2., corr. Print., 1998, XVII, 414 S.

Today, the only available materials that are located above the line in the previously mentioned Abbe diagram are single crystals and polycrystalline material. The production of single crystals with known crystal growing techniques, however, is very expensive especially for high melting components, because of the very expensive breeding crucible material; further, this method is subject to limitations with respect to chemical compositions. Furthermore, crystals cannot be produced in a near-net-shape or near-net-format manner, resulting in significant post-processing effort.

$R_2Ti_2O_7$ single crystals can have high refractive indices (see Shcherbakova et al., Russ. Chem. Rev. 48, 423 (1979)). The production of single crystals is, as indicated above, very expensive and does not render manufacture of larger optical elements possible.

The article K. N. Portnoi et al., Izvestiya Akademii Nauk SSSR, Neorganicheskie Materialy, Vol. 6, No. 1, 91 (1970) does not contain any data or hints regarding the refractive indices of polycrystalline materials.

The crystals that are described in Malkin et al. Phys. Rev. B 70, 075112 (2004) are made from $Yb_2Ti_2O_7$ and are obtainable via Floating Zone Methods in large individuals. The thicknesses are indicated as being up to 1.5 mm.

Although polycrystalline ceramics are obtainable in a wide range of compositions, they usually show insufficient optical quality, especially as far as homogeneity of refractive index and transmission is concerned. By now only few composition ranges and structure types are known that provide for transparent ceramics with sufficient optical quality.

For example the Japanese laid-open patent application JP 2000-203933 discloses the production of polycrystalline YAG by application of a certain sintering process. The position of YAG in the Abbe diagram or $P_{g,F}$-diagram ($n_d$=1.83, Abbe number=52.8; $P_{g,F}$=0.558; delta $P_{g,F}$=0.0031), which is not exotic enough and does not suffice for most applications, is a disadvantage of YAG for passive linear optical applications. The YAG system is disadvantageous because, although chemical variability is high, the structure only accepts trivalent cations. The possibilities of variation (tuning) of optical properties which are, besides other factors, influenced by the UV band gap structure, are therefore not sufficient for many purposes.

In U.S. Pat. No. 6,908,872 a translucent ceramic material is described which utilizes barium oxide as obligatory component in the ceramic. The thus obtained ceramic shows perovskite structure and is para-electric. However, ceramics comprising such barium-containing phases with perovskite structure show insufficient optical imaging quality. This results from the tendency of many perovskites to form distorted ferro-electrical crystal structures and thus loose their optical isotropy. This inter alia leads to an undesired birefringence of the crystals from which the ceramic is made. Furthermore, transmission in the blue spectral region (wavelength around 380 nm) is insufficient.

Transparent ceramics of the composition $La_2Hf_2O_7$ (LHO) are known from Ji et al., "Fabrication of Transparent $La_2Hf_2O_7$ Ceramics from Combustion Synthesized Powders", Mat. Res. Bull. 40 (3) 553-559 (2005). Therein powders of the target composition are used that have been obtained by combustion reactions. Only such ceramics are obtained that show transparencies of 70% at a sample thickness of <1 mm, which is too low for optical applications.

$Ti^{4+}$-comprising, active $La_2Hf_2O_7$ as transparent ceramic material for scintillator applications is known from Ji et al., "$La_2Hf_2O_7$:$Ti^{4+}$ ceramic scintillator for X-ray imaging" J. Mater. Res., Vol. 20 (3) 567-570 (2005) as well as from CN 1 587 196 A.

0.5 at %-5 at % $Tb^{3+}$-doped active LHO as transparent ceramic material is described in Ji, Y M; Jiang, D Y; Shi, J L in "Preparation and spectroscopic properties of $La_2Hf_2O_7$: Tb" (MATERIALS LETTERS, 59 (8-9): 868-871 April 2005). These active, i.e. light emitting, lanthanum compounds are not suitable for the desired application as passive optical elements.

DE 10 2006 045 072 A1 describes an optical element including a single phase optoceramic. However, the materials are of cubic structure of the $ZrO_2$ type which is stabilized by $Y_2O_3$. Such crystal structures are different from a stable cubic pyrochlore or stable fluorite structure and suffer the corresponding disadvantages.

Klimin, et al, in "Physics of Solid State", Vol. 47, No. 8, 2005, describes single crystal material and polycrystalline compounds, however does not address optical grade transparency of any polycrystalline material. Polycrystalline material is in the form of pressed powder that is slightly consolidated at quite low temperatures not higher than 1400° C. This procedure does not and cannot result in a material with sufficient optical properties.

WO 2007/060816 describes a translucent ceramic expressed by the general formula: $A_xB_yO_w$ (herein the condition of $1.00 \leq x/y \leq 1.10$ is satisfied and w is a positive number to maintain the electrically neutral condition) as the major component. The crystal system of this major component is the cubic crystal system, which comprises the pyrochlore type compound. Here an $A_2O_3$-rich composition is described which leads to a pre-powder after pre-sintering in a certain oxygen-rich atmosphere and then in a second sintering in $O_2$-flow to $A_2B_2O_7$ translucent ceramics. Although the optoceramics described in this reference have cubic pyrochlore structures they are rich in $A_2O_3$ component, which leads to optical deficiencies.

EP 1 992 599 describes a polycrystalline optoceramic comprising an oxide of the stoichiometry $A_{2+x}B_yD_zE_7$, wherein $0 \leq x \leq 1$; $0 \leq y \leq 2$; $0 \leq z \leq 1.6$ and $3x+4y+5z=8$ and wherein A is at least one trivalent rare earth metal cation, preferably Y, Gd, Yb, Lu, La and Sc; B is at least one tetravalent cation, especially Ti, Zr, Hf, Sn and/or Ge; D is at least one pentavalent cation, especially Nb and/or Ta; and E is at least one anion that is essentially divalent. Here an $A_2O_3$-rich composition leading to $A_2B_2O_7$ transparent ceramics after vacuum sintering is described. Although the optoceramics described in this reference have cubic pyrochlore structures they are rich in $A_2O_3$ component, which leads to optical deficiencies.

SUMMARY OF THE INVENTION

A transmissive optical element according to the present invention has the property of letting electromagnetic radiation pass through. The ray intruding into the optical element at a certain angle, assuming coplanarity and thus missing curvature at the entry and exit surface of the element, exits the element at the same angle. This means that electromagnetic radiation does not change its direction while passing through a transmissive optical element.

A diffractive optical element (DOE) in the sense of the present invention is an element comprising at least one surface, which surface comprises structures in the size range of the wavelength of the electromagnetic radiation, which structures implement optically effective functions. These structures are for example holographic grates or holograms implementing optical functions or a Fresnel zone plate. Those structures have high refractive effectiveness over their whole cross section.

It is the object of the present invention to provide optoceramic material with high refractive index and/or high Abbe number and/or an excellent, special relative partial dispersion, which properties cannot be achieved with conventional glasses, single crystal material or other polycrystalline ceramics or materials.

According to another aspect of the present invention the claimed material family has high variability in the sense of substitution of metal ions of different valency so that optical properties can be varied in wide ranges. Furthermore, a cost-effective production of the optoceramic material is possible.

According to a further aspect of the present invention an optical element is provided from the above-indicated material, which shows high and steady transmission characteristics in the visible and/or infrared wavelength region. Furthermore, an optical imaging system comprising an optical element made of such material is provided.

It is a further aspect of the present invention to provide optoceramic compositions that are suitable for production of transparent optoceramic elements for use as lenses or panes which have refractive indexes at 633 nm between 1.98 and 2.8, an in-line transmission of above 60% at a sample thickness of 3 mm and an optical birefringence of below 5 nm/cm.

With the target compositions described herein it is possible to provide an optoceramic optical element that can be used with a reduced surface angle while improving imaging behavior.

Choice and amounts of the components chosen for the ceramic composition mainly depend on the refractive index that shall be achieved in the final optoceramic. Upon thickness reduction of a transparent optical element, the angle of deflection is altered, too, thereby changing the focus of the optical element. As a result, materials with high refractive indexes above 1.98 are needed for miniaturization of optical elements.

It has surprisingly been found that transparent ceramics with the above-described optical properties for production of novel optical lens systems can be obtained by providing ceramics with the following stoichiometric compositions of cubic pyrochlore or fluorite structure:

wherein $-1.15 \leq x \leq 0$ and $0 \leq y \leq 3$ and $0 \leq z \leq 1.6$ as well as $3x+4y+5z=8$ and wherein A is at least one trivalent cation selected from the group of rare earth ions, B is at least one tetravalent cation, D is at least one pentavalent cation and E is at least one divalent anion.

It is preferred that $-1.0 \leq x \leq 0$, further preferred $-0.55 \leq x \leq 0$, more preferred $-0.4 \leq x \leq 0$, more preferred $-0.25 \leq x \leq 0$, further preferred $-0.1 \leq x \leq 0$, further preferred $-0.05 \leq x \leq 0$ and most preferred $-0.02 \leq x \leq 0$. In preferred embodiments of the present invention $x<0$. It is especially preferred that $x<-0.01$.

Only such optoceramics are preferred according to the present invention that have crystals of symmetrical, cubic structure. This only refers to such structures that are analogue to the cubic structures of the minerals pyrochlore or fluorite.

Upon compliance with the above-listed prerequesites the advantageous optoceramics of the present invention can be obtained. This is particularly true for the advantageous transmission properties.

Preferable A is a trivalent cation selected from the group of rare earth cations of the non-coloring oxides of Y, Gd, Yb, Lu, Sc and La and mixtures thereof. More preferable A is selected from the group of ions consisting of Y, Gd, Yb, Lu and Sc and mixtures thereof. Most preferably A is selected from Gd, Lu and Yb and mixtures thereof. A particular preferred embodiment defines A as Gd, Lu or mixtures thereof.

Furthermore, $B^{4+}$ is preferably a tetravalent ion selected from the group consisting of Ti, Zr, Hf, Sn and Ge, and mixtures thereof. More preferable B is selected from the group of ions consisting of Zr, Ti, Hf and mixtures thereof.

In the position of B there may also be pentavalent cations like $Nb^{5+}$ or $Ta^{5+}$. As a consequence the position of B may only be half-occupied by $D^{5+}$ in pyrochlore phases, the second half is occupied by a trivalent cation, like for example a rare earth ion, preferably Y, La, Gd, Yb, Lu, Sc. The general formula then is $Al_2^{3+}A2^{3+}D^{5+}E_7$ or, if $Al^{3+}=A2^{3+}$ the result is $A_3^{3+}D^{5+}E_7$.

But also phases with a stoichiometry of $A_3^{3+}D^{5+}E_7$ or $A_2^{3+}B_2^{4+}E_7$ with cubic fluorite structure are claimed.

The indication that E is at least one anion that is essentially divalent means that E can be replaced by one anion or more than one anion and that this anion or these anions for the most part, i.e. by at least 90 at %, preferably at least 95 at %, particularly preferably at least 98 at % comprise divalent anions, preferably O or S. The rest, up to 10 at %, preferably up to 5 at %, particularly preferably up to 2 at %, may be anions with different valency, preferably monovalent anions. As monovalent anions the group of the halogen ions is particularly preferred, especially the anions of the group F, Cl and Br. Preferably, E is a chalcogen, i.e. a member of group VIB of the periodic table of elements. Compounds that are added to the compositions of the present invention are usually added in form of compounds like for example $A_2E_3$ or $BE_2$. Such compounds are hereinafter referred to as "chalcogenides".

In a preferred embodiment $E=O_{1-n}S_n$ and $n \leq 0.5$

In such compositions of preferred embodiments, in which the components A, B, D and/or E are built by more than one cation or anion, the resulting composition is a stable mixed crystal phase with cubic pyrochlore or fluorite structure.

The family of the pyrochlores is exceptionally extensive. The crystal structure is cubic and accepts a large number of isotypical substitutions with different valencies on the position of A as well as B. Depending on ion radii, compositions of the stoichiometry $A_2B_2E_7$ or $A_3DE_7$ optionally crystallize as orthorhombic weberite-type, monoclinic perovskite-type, cubic fluorite type or cubic pyrochlore type. Only the last-mentioned cubic systems are claimed as optoceramics or their application as lenses.

An overview over the multitude of compositions with pyrochlore structure can be found in "Oxide Pyrochlores—A review" by Subramanian et al. (Prog. Solid. St. Chem. Vol. 15, p. 55-143 (1983)).

The optoceramics according to the present invention consisting of cubic grains (crystals, crystallites) with pyrochlore or fluorite structure of the general formula $A_2^{3+}B_2^{4+}E_7$ or $A_3^{3+}D^{5+}E_7$ are preferably manufactured by sintering at least one chalcogenide or a mixture of rare earth chalcogenides, preferably chalcogenides of the type $A^{3+}_2E_3$ with $A^{3+}$=Y, Gd, Yb, Lu, La, Sc; of the type $B^{4+}E_2$ with $B^{4+}$=Ti, Zr, Hf, Sn, Ge and of the type $D_2^{5+}E_5$ with $D^{5+}$=Nb, Ta.

Apart from optoceramics comprising phases of pure components, mixed crystal phases are also possible. In mixed crystal phases an A cation can be replaced in arbitrary amounts by a second A cation. It is preferred that up to 50 mol %, further preferred up to 40 mol % of the first A cation is replaced by a second A cation. It is particularly preferred that up to 25 mol % of the first A cation is replaced by the second A cation. The same is true for the B and D position.

It is essential herein that the ratios of the components of the mixture are chosen such that the cubic structures of the pyrochlore or fluorite relating to the compositions $A_2^{3+}B_2^{4+}E_7$ or $A_3^{3+}D^{5+}E_7$ are preserved. In the scope of this invention a ceramic with cubic structure is a ceramic that consists of a matrix of crystals, wherein the single crystals have cubic structures. Preferably, the material consists of more than 95% of the cubic phase, further preferably more than 98% of the cubic phase, and more preferably more than 99% of the cubic phase.

Every mixed crystal phase according to the present invention has a cubic crystal structure, isotypical to that of $Y_2Ti_2O_7$ or $La_2Zr_2O_7$ (pyrochlore) or $Y_3NbO_7$ (fluorite). These structure types are for example described in Terki et al.: "Full potential linearized augmented plane wave investigations of structural and electronic properties of pyrochlore systems", J. Appl. Phys. Vol. 96(11)6482-6487 (2001).

The crystallites, from which the polycrystalline optoceramics of the present invention are composed, have cubic crystal structures. This leads to an isotypical, birefringence-free optical behavior. They have dielectric properties, i.e. due to their cubic structure no permanent dipoles occur and the material is optically isotropic. Hence, also the optical properties are isotropic.

Furthermore, the crystallites of the polycrystalline optoceramics according to the present invention preferably have an average particle diameter of more than 500 nm, particularly, preferably more than 1000 nm. Herein, the average particle diameter (or average grain diameter) is understood to be the average particle diameter as determined according to S. A. Saltykov, "Stereometrische Metal-lographie", Deutscher Verlag für Grundstoffindustrie, Leipzig, 1974.

According to the present invention the above problem is solved by a refractive, transmissive or diffractive optical element comprising the above-described optoceramic. Preferably, such an element is present as a lens. The best effect can be achieved if the optical element consists of the optoceramic according to the present invention.

According to another aspect of the present invention an optical imaging system with lenses is provided, said system comprises at least two different transparent materials, wherein at least one lens is manufactured from an optoceramic as explained above. The invention is based on the insight that by application of two different transparent lens materials within an optical imaging system, like for example an objective, novel imaging properties can be provided. Especially the possibility of achromatisation of the optical imaging system is made possible with a comparatively low number of refractive optical elements, which effect could not be achieved by application of conventional glass types.

An example is the application of only three refractive optical elements for construction of a compact objective with approximately apochromatic imaging properties. In total, the present invention makes it possible to provide optical imaging systems for correction of chromatic aberrations with very low weight, low depth of installation space and low costs, which systems are compact when compared to multi-lens systems according to the state of the art.

Therein, according to another aspect of the present invention, the lenses can be constructed purely refractive. The lenses can be aligned solitarily or with certain distances towards each other. Some lenses can basically be incorporated into a group of lenses, for example as a lens duplet or lens triplet etc.

According to a further alternative aspect of the present invention at least one lens can have diffractive structures, which structures are for example embossed, pressed or written into the surface or the volume of the lens, like for example in the form of Fresnel zone plates, diffraction gratings—also blazed diffraction gratings.

According to another preferred embodiment of the present invention, the optical imaging system comprises at least one lens made from glass, thus the optical imaging system comprises at least one lens manufactured from transparent optoceramics as described before and at least one lens made from a matched glass.

The above-described lenses can be incorporated into a compact objective with a predetermined focal distance. According to a further embodiment of the present invention, the first lens on the object side of the optical imaging system can be purely refractive, preferably a spherical lens.

As predominantly transmissive optical element the optoceramic can be used as a transparent protection element, preferably a window.

BRIEF DESCRIPTION OF THE DRAWING

In the following examples of the optical elements of the present invention are described with reference to the accompanying figures, so that further features, advantages and problems to be solved become apparent.

Figure 1A:
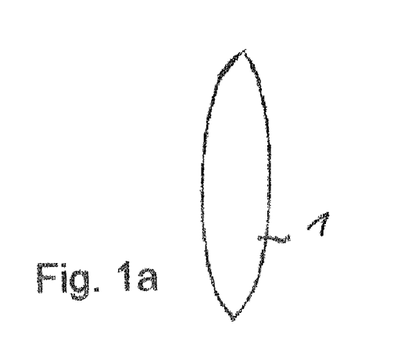
FIGS. 1a to 1d are respective diagrammatic plan views of four examples of optical elements manufactured from the optoceramics according to the present invention.
Figure 1B:
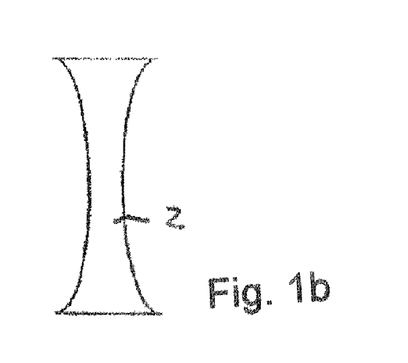
Figure 1C:
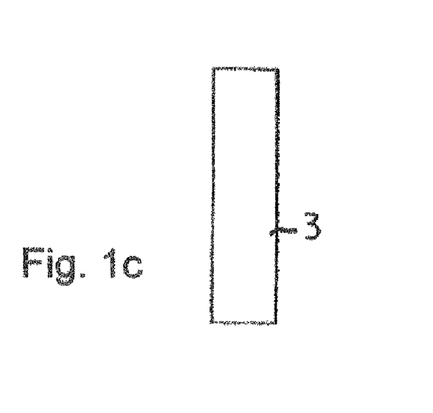
Figure 1D:
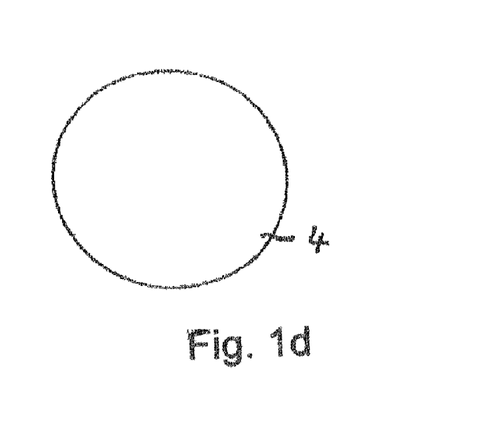

The four examples of transmissive and/or refractive optical elements according to the present invention shown in FIGS. 1a to 1d comprise a biconvex lens 1, a biconcave lens 2, a purely transmissive optical element 3 and a spherical lens 4. The indicated lenses 1, 2 and 4 are preferred applications of the optoceramics according to the present invention with regard to the optical elements.

DESCRIPTION OF THE PREFERRED EMBODIMENTS

As described in the following, the optoceramics according to the present invention are transparent materials with refractive indexes $n_d$ above or equal to about 1.90, preferably between about 2.0 and about 2.7, particularly preferred between about 2.1 and about 2.7. Most preferred is a refractive index of above 2.25 and even more preferred above 2.30. An Abbe number concurrently is in the range of from about 10 to about 45, preferably between about 10 and 40, particularly preferred between about 12 and 35. This facilitates novel combinations of materials for use in achromatisation of lens systems.

All of the claimed optoceramics are mixed systems, i.e. they consist of at least two cations of different valency (positions of A, B, D). The stoichiometry of the oxidic powder batch or of the finished compound powder must hence be exactly oriented to this stoichiometry. Ideally, the compositions only differ in the range of up to 10 mol %, ideally up to 5 mol % from the target compositions. Otherwise a further undesired phase (with different refractive index or different structural symmetry other than cubic) may come up during sintering. For some target phases mixed crystal phases result, i.e. under-/overdose of one of the chalcogenides is compensable by the crystal structure.

These are for example the phases $La_2Zr_2O_7$ and $La_2Hf_2O_7$, the phase diagrams of which (Phase Diagram for Ceramists; No. 5232) show mixed crystal areas in a magnitude of up to 25 mol % (i.e. −12.5%/+12.5%) around the target stoichiometry. With $La_2Hf_2O_7$ this is about 20 mol %±10 mol % according to the phase diagram (Phase Diagram for Ceramists; No. 2371). Even if mixed crystal phases are missing, the production of the optoceramics with high qualities is possible (see as a comparison for example YAG; Phase Diagram No. 2344).

All of the materials have cubic crystal structures. Mixture of A-, B- and D-cations in their respective positions is also possible, this is true for example in $(Yb,Y)_2Ti_2O_7$, $La_2(Hf,Zr)_2O_7$ and $(La,Gd)_2(Hf,Zr)_2O_7$. Also the arrangement of three different elements at a single position is possible, which facilitates a multiplicity of possibilities to adjust refractive indexes and dispersions.

Also mixtures of two or more terminal elements are possible, which elements as single components have different structures, namely either cubic pyrochlore or cubic fluorite structure (for example $Y_2Ti_2O_7$:pyrochlore and $Y_2Zr_2O_7$: fluorite structure).

Also variants are possible with three or more than three cations.

The chalcogenides that can be applied according to the present invention form compositions, which usually do not show optical activity in the visible spectral region, i.e. at about 380 to 800 nm, i.e. light in this spectral region is neither absorbed nor emitted. The ceramics are usually essentially uncolored, fluorescence is not present.

For the passive elements according to the present invention (for example lenses), a possible fluorescence must be suppressed purposefully. This is warranted by use of raw material with exceptionally high purity. The content of optically active, impurity (for example active ions from the group of rare earth elements (RE) or transition metals) is reduced to a minimum according to an embodiment of the present invention. This is preferably <100 ppm, further preferably <10 ppm, particularly preferably <1 ppm and most preferably the optoceramics are free of ions Pr, Nd, Sm, Eu, Tb, Dy, Ho, Er and Tm.

By adequate combination of the oxides the optical properties like transparency, refractive index, Abbe number and partial dispersion can be adjusted to the respective prerequisites.

Preferably, the refractive indexes of the optoceramics according to the present invention are in the range of above or equal to about 1.9, further preferably between about 2.0 and about 2.7, particularly preferably between about 2.1 and about 2.7, and the Abbe number is between about 10 and about 45, preferably between about 10 and about 40, and particularly preferably between about 12 and about 35.

According to the present invention the values of the internal transmittances of the optoceramics differ in a wavelength range of from 600 nm to 800 nm, preferably in the wavelength region of 500 nm to 800 nm by up to about 10% when compared to the value of internal transmittance at 600 nm. The transmissions of the optoceramics according to the present invention are hence very steady in the wave-length region that is preferred for their use.

Method of Producing the Optoceramics According to the Present Invention

The optoceramics according to the present invention are particularly preferably manufactured by sintering oxides (reactive sintering of the single components or sintering of the powder already present in the target stoichiometry). This route is simple and cost-effective and is readily adaptable to the desired optical parameters of the developed optoceramics. The production via this route implements the steps as described in more detail in the following. These steps are powder production, powder conditioning, molding and annealing. Preferably, further processing steps, like for example a HIP step, follow.

Preferably, sintering is carried out in vacuum. Powder beds are avoided. According to preferred embodiments of processes for production of the optoceramics as described herein a further sintering in a hot isostatic press takes place.

1. Powder Production

The production of the optoceramics is done by application of appropriate powders. Methods for this are (co-)precipitation, flame hydrolysis, gas condensation, laser ablation, plasma spray methods (CVS method), sol-gel methods, hydrothermal methods, combustion etc. With respect to high packing densities the grain shape is preferably round or spherical; the grains are only loosely connected to each other by van-der-Waals forces (soft agglomerates). The grains are ideally only connected to each other by weak bridges in the form of sinter necks. Referring to chemical precipitations there is a great dependency of the grain fraction and shape from the precipitation conditions. The choice of precipitation media (carbonate precipitation, hydroxide precipitation, oxalate precipitation) of for example a nitrate or chloride solution of for example Y-nitrate (yttrium nitrate) or Y-chloride (yttrium chloride) makes production of a broad spectrum of starting powders possible. Also different drying methods of the dry sludge (simple air drying, lyophilisation, azeotrope distillation) result in different powder qualities and starting properties (like for example specific surfaces). During precipitation furthermore a multitude of further parameters (pH value, stirrer rotation, temperature, precipitation volume etc.) have to be controlled.

Purity of the powder is a crucial criterion. Any impurity can lead to changed sintering conditions or inhomogeneous distribution of optical properties. Impurities can lead to formation of liquid phases, which in the worst case lead to broad inhomogeneous grain boundary regions. The formation of intergranulary phases (amorphous or crystalline) must be avoided, because these cause differences in refractive index with the consequence that transmission losses due to dispersion will occur upon light pass.

The use of hard agglomerates, i.e. primary particles that built up multiple bridges during precipitation or calcinations are more or less baked together due to these circumstances, is also possible depending on the applied method. For example J. Mouzon describes in a published thesis "Synthesis of Yb:Y$_2$O$_3$ nanoparticles and Fabrication of Transparent Polycrystalline Yttria Ceramic", Lulea University of Technology, Int. No. 2005:29 for the Yttria system that in order to avoid intergranular pores, i.e. pores between grains, differential sintering was of advantage. This is provided by hard agglomerates. Therein the primary particles within an agglomerate sinter densely in a first step, remaining pores are preferably located in the grain boundary regions. These could be removed from the system by applying the method of hot "isostatic pressing".

Upon production of (co-)precipitated powders there furthermore exists the possibility to diminish the tendency towards agglomeration by purposefully adding certain agents. Thereby the necessity of a grinding step is bypassed. For this purpose there exists the possibility of adding NH$_4$OH before calcinations of a precipitated oxalate suspension.

Far greater flexibility as far as adjustment and fine-tuning of optical properties by changing compositions are concerned is possible by manufacturing the mentioned optoceramics by reactive sintering. In reactive sintering chalcogenide mixtures are used that react to become the desired component during the sintering process.

A possibility to obtain prereacted powders of the target composition is a calcination step of the mixed chalcogenide powders at temperatures ranging between 900 and 1300° C., depending upon the phase diagram.

2. Powder Conditioning

The powders are processed further differently, depending on molding. As a rule grinding of the powder takes place with the purpose of a) disintegration of present agglomerates, b) homogenization of the powders, if additives are added. Grinding can be dry or wet; the media for the latter are for example alcohols or water-based media. The times for grinding can reach up to 24 hours, should however be chosen as to avoid abrasion from the grinding elements (Al$_2$O$_3$, ZrO$_2$) or from the inner lining of the mill. As mills annular gap mills, attritor mills, ball mills etc. are suitable. As media for example water, liquid alcohols or liquid hydrocarbons like heptanes or others can be used.

Drying of the batches can take place with air at low temperatures; in the most preferred case the grinding suspension is dried via spray drying. Herein granules of defined size and quality can be obtained. During spray drying binders should be used. Preferably spray drying leads to soft agglomerates. The agglomerate size should not exceed 100 µm, agglomerates in a size range of from 10 to 50 µm are favorable and agglomerates <10 µm are ideal. Also lyophilisation and whirling stream drying are possible.

Additives may be needed, if the nanopowder or nanopowder agglomerate shall be pressed. For molding by casting, for example slip casting, die casting, centrifugal casting the powder batch must be dispersed in suitable liquids. For this purpose for example Darvan, Dolapix, polyacrylic acids, ammonium oxalate monohydrate, oxalic acid, sorbitol ammonium citrate or others can be applied.

For plastic molding (extrusion, die casting, hot casting) organic binders of the type polyolefin for example HOSTAMOND® by Clariant or catalytically disintegrating binders like for example of the type CATAMOLD® by BASF have to be added and homogenized in a suitable way.

3. Molding

In principle any imaginable ceramic molding method can be applied. These are the liquid, plastic and dry molding methods. In detail, the following liquid molding methods are particularly preferred: slip casting, pressure slip casting, vacuum die casting or gel casting. As plastic molding methods hot casting, ceramic injection die casting, or extrusion are possible. Dry molding particularly refers to uniaxial and/or cold isostatic molding.

The choice of the respective molding method is geared to the prerequisites of the final product (quality, size, and amount) or its desired properties.

In a preferred embodiment, molding tools may be used in the molding step, which molding tools are design to be near-net-shaped, thus avoiding any expense in further processing or at least reducing the same. By this near-net-shaping costs are reduced. Such molds are for example described in the patent application DE 10 2007 002 078.5. The disclosure of this patent application is hereby fully incorporated into this application by reference as far as the optoceramics according to the present invention are concerned.

4. Annealing

Vacuum sintering facilitates removal of open porosity from the compacted powder. Vacuum conditions are above $10^{-3}$ mbar (=$10^{-3}$ hPa), preferably pressures between $10^{-5}$ and $10^{-6}$ mbar (=$10^{-5}$ to $10^{-6}$ hPa) are applied. The sintering conditions vary with the respective material. As an example programs with T=1500° C. to 1900° C. and sintering times between 1 and 10 hours are mentioned.

Alternatively, sintering may take place in special atmospheres (He, hydrogen [dry or wet], N$_2$, Ar).

During vacuum sintering attention has to be paid to grain growth not being too fast and uncontrolled. The object is not to include pores into the grains. For this purpose for example the sintering temperatures should be kept low. The sample may still be opaque afterwards due to the high pore density, but the pores are closed.

By applying a HIP step afterwards the closed porosity in the grain boundaries can be pressed from the system. Exemplary conditions are 1500° C. to 1800° C. and pressures between 100 MPa (1000 bar) and 300 MPa (2000 bar). Sintering times between 1 and 10 hours (without heating and cooling phases) are usual. As heating element W and Mo, possibly also graphite can be used.

As pressure gas argon can be used. In order to avoid dissolving argon in the grain boundaries, for example in vitrified intermediate phases, the sample can be encapsulated or embedded in specific powder. Thereby, colorations by reduction of material on the surfaces or contamination of the sample by the heating element in the oven can be avoided, "post-tempering" in air is not necessary. If post-tempering still were necessary, it should take place in air or oxygen. Exemplary conditions are 1 to 48 hours at up to 1400° C.

By conducting a special processing the intragranulary fine porosity can also be decreased. This happens by purposeful grain growth, which takes place such that newly built grain boundaries grow over the area of pore volume included into the grain. For this purpose the sample undergoes another sintering process after the HIP step.

Instead of vacuum sintering with following HIP step, also the combined step of "vacuum hot pressing" can be applied.

Manufacturing of the ceramic with powder of the target composition, obtained for example by Flame Spray Pyrolysis or co-precipitation is also possible.

Production Method Examples

In the following some examples of the methods of producing the above-mentioned optoceramics are described. The examples are not supposed to limit the scope of this invention; material and methods can be changed if necessary. It should be noted that the examples are preferred embodiments of the present invention.

1. Example for Manufacturing a Transparent Ceramic from Gd—Hf-Pyrochlore by Dry Pressing (Reactive Sintering)

Powder with primary particles with diameters <1 μm, preferably nanoscale size (<100 nm), of $Gd_2O_3$ and $HfO_2$ are weighed in the proportions 26 mol % $Gd_2O_3$ and 74 mol % $HfO_2$ and mixed in a ball mill. Grinding takes place at the same time using $ZrO_2$ balls and ethanol to prepare a suspension. Additionally a binder and surface sensitive additives are added. Mixing and grinding is carried out for 12 h.

The grinding suspension is dried on a heater or a spray drier.

The powder is pressed to discs uniaxially afterwards, preferably the molds are designed such that at least one surface has the contour of the desired lens. Pressure conditions are between 10 and 50 MPa, pressure times are between some seconds to 1 min. The pre-form is additionally densified in a cold isostatic press, wherein pressure is between 100 and 300 MPa. The pressure medium is water.

Afterwards the binder is combusted in a first thermal step at a temperature of 700° C. for 3 h. This calcined green body is afterwards sintered in a vacuum, a temperature in the range of from 1500 to 1900° C. in a sintering oven (pressure: $10^{-2}$ to $10^{-6}$ mbar $10^{-5}$ to $10^{-6}$ mbar); optionally sintering takes place in hydrogen or helium at a temperature of 1600 to 1900° C. for 3 to 20 h. The target composition may be formed during this sintering step.

In subsequent hot isostatic pressing (HIP) closed pores are removed. HIP conditions are for example at 1780° C.-60 min-Ar-200 MPa.

Optically transparent and homogeneous bodies are obtained that can be processed further to obtain lenses.

2. Example for the Production of a Transparent Ceramic from Lu—Zr-Pyrochlore by Centrifugal Die Casting (Reactive Sintering)

Powder with submicron (<1 μm), preferably nanoscale (<100 nm), primary particles are weighed in the proportions 15 mol % $Lu_2O_3$ and 85 mol % $ZrO_2$. Calcination of the powders at 1100° C. resulted in a prereacted powder of the target composition. Afterwards the prereacted powder is mixed in a ball mill to obtain a slip of nanoscale ceramic powder (35% by weight), with solvent (51% by weight water), dispersant (5% by weight carbonic acid ester), binder (4% by weight PVA), plasticizer (4.5% by weight glycerol, ethylene glycol and polyacrylate), defoaming agent (0.25% by weight) and tenside (0.25% by weight). Afterwards the obtained mass is transferred into the centrifuge and centrifuged at 3000 rotations per minute until the whole mass has settled on the bottom of the plastic (PMMA) container, then centrifugation is carried on for another 15 minutes. The bottom of the centrifugation container can be of lens shape. Deforming and combustion of the binder is done at 600° C. with a heating rate of 100 K/h and dwell time of 8 h. Vacuum sintering takes place at $10^{-5}$ to $10^{-6}$ mbar with a heating rate of 300 K/h up to 1300° C. and a dwell time of 3 h followed by a step at higher temperature of 1750° C. for 5 h. HIP is performed afterwards with a heating rate of 300 K/h up to 1800° C. and a dwell time of 5 h and a pressure of 200 MPa.

3. Example for the Production of a Transparent Ceramic from Gd—Hf—Ti-Pyrochlore by Hot Casting (Reactive Sintering)

In a heated ball mill the ceramic nanoscale $Gd_2O_3$ (32 mol %), $TiO_2$—$HfO_2$ (68 mol %) powder mixture is mixed with the thermoplastic binder (mixture of 75% by weight paraffin and 25% by weight of nanoscale wax) and the surface active ingredient siloxane polyglycol ether (single molecular coverage of the ceramic particle surface) at 80° C. Therein the viscosity of the final slip is 2.5 Pas with a solid particle content of 60 vol %. With a casting pressure of 1 MPa the slip is transferred directly into the plastic mold (hot casting). Expulsion of the binder is done after deforming above the melting point of the applied wax, wherein about 3% by weight remain in the green compact, in order to provide for the required stability. The binders and surfactants-remaining in the green compact are combusted during the subsequent sintering step. Vacuum sintering takes place with a heating rate of 300 K/h up to 1600° C. and a dwell time of 10 h. During sintering the target composition $Gd_2(Hf,Ti)_2O_7$ is formed. The vacuum conditions are between $10^{-5}$ to $10^{-6}$ mbar. HIP takes place with a heating rate of 300 K/min up to 1780° C. and a dwell time of 10 h at a pressure of 200 MPa. Post annealing takes place at a temperature of 1100° C. in air with a heating rate of 150 K/h.

4. Example for the Production of a Transparent Ceramic from $Gd_3TaO_7$ by Uniaxial Pressing Powder with submicron (<1 μm), preferably nanoscale (<100 nm), primary particles of $Gd_2O_3$ and $Ta_2O_5$ are weighed in the proportions of the target composition and mixed or homogenized in a bail mill. Grinding takes place in ethanol with $ZrO_2$ balls, wherein the grinding suspension furthermore comprises binder, surface sensitive additives etc. Grinding takes place over night. The grinding suspension is optionally dried on a heater or the suspension is granulated in a spray drier.

The powder is pressed to disks uniaxially. The pressure conditions are between 10 and 50 MPa, pressure times are a few seconds up to 1 min.

The pre-form is re-densified in a cold isostatic press, wherein the pressure is between 100 and 300 MPa. The pressure medium is water.

Afterwards the binder is combusted in a first thermal step. Annealing time and temperature are between 60 min and 550° C.

The combusted green body is afterwards sintered in a vacuum sintering oven (low-pressure $10^{-5}$ to $10^{-6}$ mbar, optionally in hydrogen or helium). Sintering is carried out at a temperature of 1700° C. for 3 h. The target composition is formed during this thermal step.

In subsequent hot isostatic pressing the closed pores are removed. HIP conditions are for example 1800° C.-60 min-Ar-200 MPa. Depending on chemism and sensitivity of the system to reduction, the sample can be reoxidized in a further thermal step (for example 1000° C., 5 hours, air).

In the end optically transparent and homogeneous bodies are obtained that can be further processed to lenses. The optoceramics according to the present invention can be processed to obtain optical elements in a near-net-shape way by application of the production process as described in the patent application DE 10 2007 002 079.3. By this reference the content of the mentioned older patent application is incorporated into the present application.

5. Example of the Production of a Transparent Ceramic from Yb—Ti-Pyrochlore by Uniaxial Pressing (including Reactive Sintering)

Powder with primary particles with diameters <1 μm, preferably nanoscale size (<100 nm) of $Yb_2O_3$ (33 mol %) and $TiO_2$ (67 mol %) are weighed. After addition of dispersant and binder the batch is mixed with ethanol and $ZrO_2$ balls in a ball mill for 12 to 16 hours.

The grinding suspension is optionally dried on a heater or a spray drier.

The powder is afterwards uniaxially pressed to disks, preferably the molds are designed such that at least one surface has the contour of the desired lens. Pressure conditions are in the range of 10 to 50 MPa, pressure times may last some seconds up to one minute. This preformed body is re-densified in a cold isostatic press, wherein pressure is between 100 and 300 MPa. The pressure conducting medium is water or oil.

Afterwards, calcination of the green body follows at a temperature of 800° C. for 3 h. The so-obtained body is afterwards sintered in a vacuum sintering oven (low-pressure: $10^{-5}$-$10^{-6}$ mbar (hPa)), optionally sintering takes place in hydrogen or helium. Sintering to a nearly nonporous body occurs at temperatures between 1600 and 1800° C. with a sintering time in the range of from 2 to 10 hours.

In subsequent hot isostatic pressing (HIP) closed pores are removed. HIP conditions are for example at 1780° C. for a time of about 2 hours under argon at 200 MPa (abbreviated as above done with 1780° C.-2 h-Ar-200 MPa). Depending on chemism and sensitivity of the system to reduction, the sample can afterwards be re-oxidized in a further thermal step (for example at 1000° C., for 5 hours, using $O_2$-flow).

Optically transparent and homogeneous bodies are obtained that can be processed further to obtain lenses.

While the invention has been illustrated and described as embodied in optoceramics, a process for their production and their uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A polycrystalline, transparent optoceramic, in which at least 95% by weight of individual crystals have a cubic pyrochlore or a fluorite structure, comprising a compound of stoichiometry $A_{2+x}B_yD_zE_7$, wherein $-1.15 \leq x < 0$; $0 \leq y \leq 3$; $0 \leq z \leq 1.6$ and $3x+4y+5z=8$; and wherein A is at least one trivalent rare earth metal cation, B is at least one tetravalent cation, D is at least one pentavalent cation and E is at least one divalent anion.

2. The optoceramic according to claim 1, in which at least 98% by weight of said individual crystals have said cubic pyrochlore or said fluorite structure.

3. The optoceramic according to claim 1, wherein A is selected from the group consisting of Y, Gd, Yb, Lu, Sc and La.

4. The optoceramic according to claim 1, wherein B is selected from the group consisting of Ti, Zr, Hf, Sn and Ge.

5. The optoceramic according to claim 1, wherein D is Nb and/or Ta.

6. The optoceramic according to claim 1, having a refractive index greater than or equal to about 1.9 and an Abbe number between about 10 and about 45.

7. The optoceramic according to claim 6, wherein the refractive index is between about 2.0 and 2.7 and the Abbe number is between about 10 and about 40.

8. The optoceramic according to claim 6, wherein the refractive index is between about 2.1 and about 2.7 and the Abbe number is between about 12 and about 35.

9. The optoceramic according to claim 1, which is transparent to visible light.

10. The optoceramic according to claim 1, which is transparent to infrared light.

11. The optoceramic according to claim 1, which is both transparent to visible light and transparent to infrared light.

12. The optoceramic according to claim 1, which is manufactured by reactive sintering of individual compounds.

13. The optoceramic according to claim 1, which is manufactured by sintering of a prereacted powder of a target composition.

14. A refractive, transmissive or diffractive optical element, comprising an essentially single phase optoceramic,
in which at least 95° A) by weight of individual crystals have a cubic pyrochlore or a fluorite structure, comprising a compound of stoichiometry $A_{2+x}B_yD_zE_7$, wherein $-1.15 \leq x < 0$; $0 \leq y \leq 3$; $0 \leq z \leq 1.6$ and $3x+4y+5z=8$; and
wherein A is at least one trivalent rare earth metal cation, B is at least one tetravalent cation, D is at least one pentavalent cation and E is at least one divalent anion.

15. The optical element according to claim 14, consisting of a lens.

16. An optical imaging system composed of at least two different transparent materials, wherein said system comprises at least one lens and said at least one lens is an optical element comprising an essentially single phase optoceramic,
in which at least 95% by weight of individual crystals have a cubic pyrochlore or a fluorite structure, comprising a compound of stoichiometry $A_{2+x}B_yD_zE_7$, wherein $-1.15 \leq x < 0$; $0 \leq y \leq 3$; $0 \leq z \leq 1.6$ and $3x+4y+5z=8$; and
wherein A is at least one trivalent rare earth metal cation, B is at least one tetravalent cation, D is at least one pentavalent cation and E is at least one divalent anion.

17. A transparent protective element comprising an optoceramic according to claim 1.

18. The transparent protective element according to claim 17, which is a window or a visor.

* * * * *